Sept. 29, 1936.  K. RAU  2,055,591
METHOD OF PRODUCING OSCILLATIONS OF HIGH FREQUENCY
Filed Dec. 21, 1932  2 Sheets-Sheet 1

Inventor:
Kurd Rau,
By Byrne Townsend & Potter,
Attorneys.

Sept. 29, 1936.  K. RAU  2,055,591
METHOD OF PRODUCING OSCILLATIONS OF HIGH FREQUENCY
Filed Dec. 21, 1932  2 Sheets-Sheet 2

Inventor:
Kurd Rau,
By Byrne Townsend & Potter,
Attorneys.

Patented Sept. 29, 1936

2,055,591

UNITED STATES PATENT OFFICE 2,055,591

METHOD OF PRODUCING OSCILLATIONS OF HIGH FREQUENCY

Kurd Rau, Berlin-Teltow, Germany, assignor to Sally Engelbert, Berlin, Germany

Application December 21, 1932, Serial No. 648,305
In Germany December 21, 1931

1 Claim. (Cl. 174—177)

This invention has for its purpose to produce oscillations of high frequency with high energetical effect by means of high vacuum tubes provided with an electron emitting cathode and at least one anode and a grid, the energy being furnished either by a source of alternating current or by a source of pulsating direct current. The essential feature in the new method of producing oscillations of high frequency consists therein that in a high vacuum tube, the cathode of which is connected directly to the one side of the source of current, the anode is connected to the other side through an induction coil and that the grid of the tube is connected to a member having a lower electric potential than the anode. So the induction coil connected to the grid may on its side be connected with the conductor leading from the source of current to the cathode or it may be connected to the one side of a supplementary source of electric current having a lower potential than the source which furnishes the current for the electrodes of the vacuum tube or it may be connected to earth, that is to say, to a body having the potential zero.

Preferably the vacuum tube is a tube with heated cathode, however it may also be a tube of such kind wherein the emission of electrons is effected simply by including the tube into a circuit of the source of current.

The invention is illustrated on the accompanying drawings in a number of embodiments.

Figures 1–7 show diagrammatically different kinds of connections for the electrodes of the vacuum tube, whereas

Figure 1:
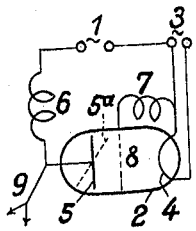

In the different figures such parts which have the same function, are designated with the same reference numerals. The reference numeral 1 designates a source of alternating current which furnishes the energy for operating the vacuum tube 2, and numeral 3 designates a further source of current of any kind which has the function of furnishing heat energy for the cathode 4. The anode of the vacuum tube is designated with the numeral 5. Induction coils 6, 7 are connected to the anode 5 and grid 8, respectively, of the vacuum tube. The operation of the vacuum tube 2 has the effect of producing oscillations of high frequency which can be made use of by a radiating element such as indicated in Figure 1 by a wire 9.

Figure 2:
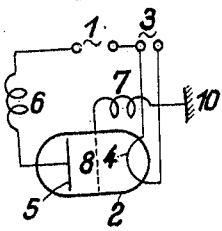

According to Figure 1 the induction coil 7 is connected with its free end, which is not in connection with the grid 8, to the conductor leading from the source of alternating current 1 to the cathode 4. According to Figure 2 the induction coil 7 is connected to earth as indicated at 10.

Figure 3:
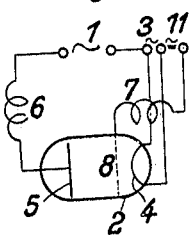

According to Figure 3 the induction coil 7 is connected to one pole of a further supplemental source of electric energy designated 11. In the embodiment of this figure three sources of electric energy are indicated, namely the sources 1, 3 and 11. The source 1 is again that source which furnishes the energy for operating the tube 2, whereas the source 3 is again a source of heating current for the cathode 4 and the source 11 is a source furnishing to the grid a supplemental tension.

Figure 4:
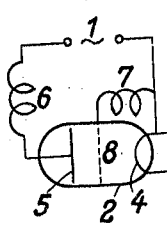
Figure 5:
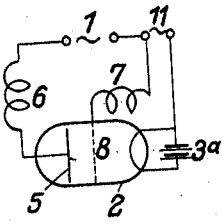
Figure 6:
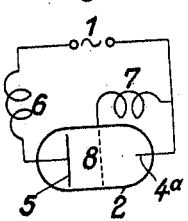
Figure 7:
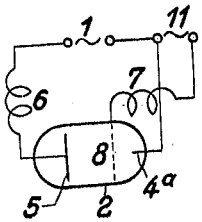

Figure 4 is practically identical with Figure 1 and only distinguished thereby in that the cathode 4 is not heated by a source 3 of alternating current but by a source 3a of direct current. The same is true with relation to Figure 5, wherein however in the same way as in Figure 3 a supplemental source of alternating current is provided to furnish a certain bias tension to the grid 8. Figures 6 and 7 show embodiments corresponding to Figures 4 and 5, however with the difference that the cathode is in this case a glowing cathode 4a which needs no heating by a heating current.

Figure 8:
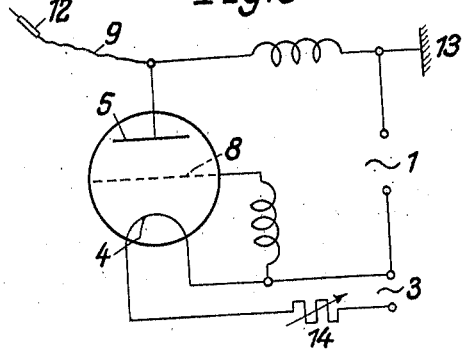
Figures 8–12 illustrate the manner of making use of the oscillations of high frequency produced by devices according to the invention such as illustrated in Figures 1 to 7.

As shown in Fig. 8, a conductor 9 connected to the anode of the vacuum tube leads to an electrode 12 adapted to be used as a surgical instrument. The high tension carrying conductor connected to the anode is connected to earth as indicated at 13. This manner of actuating a knife or like surgical instrument in effecting operations is connected with a remarkable progress insofar as it does not require the contact of an inactive electrode with the body of the patient.

In Figure 8 it has been indicated at 14 that the heating current furnished to the cathode 4 by the heating source 3 can be controlled as desired; 14 indicating an adjustable non-inductive resistance. This is a point of considerable importance in connection with the device according to the invention, because the effect aimed at is only reached when the cathode is kept at the proper temperature. Also in Figures 9, 10 and 11 showing further embodiments of making use of the oscillations of high frequency produced by the device such means for controlling the temperature of the cathode are indicated.

Figure 9:
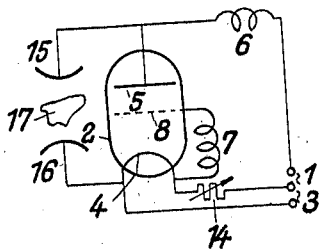

Figure 9 shows a further embodiment according to which the device may be used by physicians as a means for producing so-called diathermic effects. In this case the anode 5 and the cathode 4 are connected to condenser plates 15 and 16 respectively. The high frequency current passing between the two plates 15, 16 produces a diathermic heating effect within a body 17 between said plates.

Figure 10:
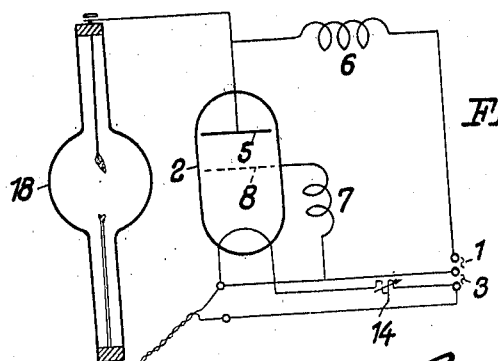
Figure 11:
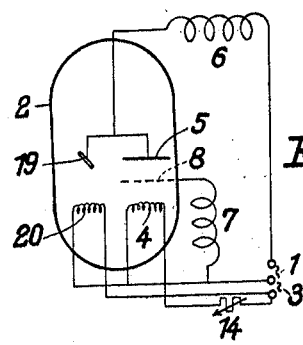

Figure 10 shows an embodiment according to which the oscillations of high frequency produced by the device of the invention are used for the operation of a so-called Roentgen tube 18.

If it is desired to produce Roentgen rays it is not absolutely necessary to use for this purpose a normal Roentgen tube and to connect it to the vacuum tube in the manner illustrated in Figure 10. It is also possible to combine the vacuum tube according to the invention with a device for producing Roentgen rays. A suitable embodiment of such combined generator of high frequency oscillations and Roentgen rays is illustrated in Figure 11. Also in Figure 1 the dotted line 5a indicates an electrode which can be used as a combined anode and Roentgen ray reflector.

In Figure 11, in lateral displacement to the anode 5, the grid 8 and the cathode 4, has been illustrated a Roentgen ray reflector 19 of the anode 20 coordinated thereto, the reflector 19 being connected to the anode 5 and the cathode 20 to the cathode 4.

Figure 12:
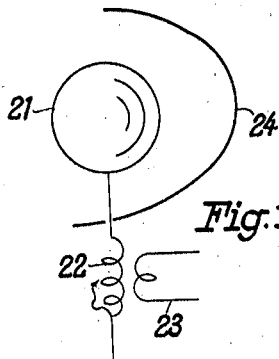

In Figure 12 the numeral 21 designates a globular surface which forms a receiver for the oscillations of high frequency adapted to be emitted for instance by the radiating element 9 of the device shown in Figure 1. This receiver is according to Figure 12 connected to earth by an electric conductor containing an induction coil 22 adapted to be adjusted according to the frequency of the oscillations impinging on the body 21. The coil 22 forms the primary of a transformer, the secondary 23 of which forms the element furnishing energy to receivers such as incandescent lamps or other electric devices. 24 designates a reflector adapted to reflect the oscillations impinging thereon from an emitter such as 9 in Figure 1 and reflecting them to the body 21.

If desired the surface of the body 21 may be made adjustable in size.

Figure 13:
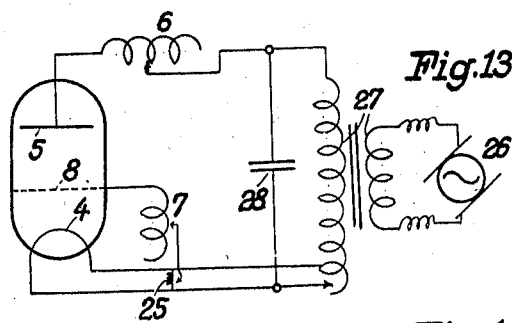
Figure 13 illustrates a modified embodiment which is provided with controlling devices for the induction coils with which the anode and the grid are connected.

The efficiency of the device here in question of course is dependent upon a suitable adjustment of its different elements. Amongst these there are first of all the induction coils 6, 7 upon which the efficiency depends. Therefore it is advisable to provide the possibility of adjustment of the induction coils as illustrated in Figure 13. This figure shows at the same time the adjustment of the heating effect on the cathode by means of a so-called potentiometer 25.

In Figure 13 it has been illustrated that the feeding of the vacuum tube with alternating current may be effected not directly by an alternating current machine 26 but by the intermediary of an electric transformer 27. In this case it is advisable to provide a safety device such as a condenser 28 connected in parallel with the secondary of the transformer 27 in order to prevent damage to the transformer by high frequency oscillations.

Figure 14:
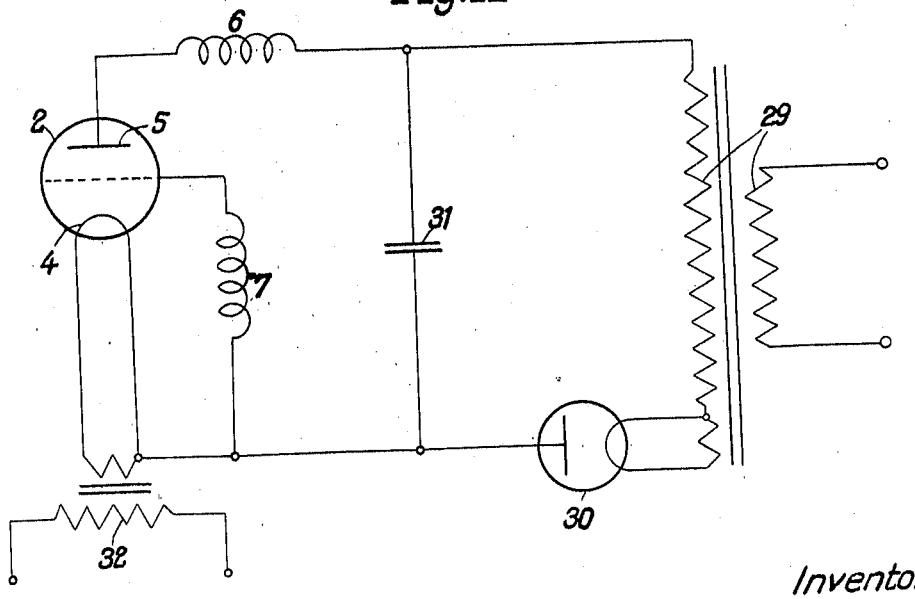
Figure 14 shows a further embodiment which is distinguished from the other embodiments shown in the several figures thereby that the vacuum tube is operated not by alternating current but by pulsating direct current.

Figure 14 shows an embodiment according to which the current for the operation of the vacuum tube is not ordinary alternating current but pulsating direct current. In this case the transformer 29 forms the source of current but cooperates with the rectifier 30, which in a similar manner as the source of current in the other figures is connected to the vacuum tube 2. In this case it is indispensable to provide the condenser 31 in order to secure the effect of producing oscillations of high frequency. The figure shows moreover the particularity that the heating of the cathode 4 is effected by a heating transformer 32.

In this description and in the following claim the word (anode) means a second electrode, which does not emit electrons; and the word grid does not mean a "grid" in the common sense but a third electrode which does not need to be between the electron emitting electrode and the other electrodes.

What I claim is:

An electro-therapeutic apparatus comprising a thermionic tube having a cathode cooperating with a grid and an anode, a cutting tool conductively connected to said anode, and means for developing a high-frequency oscillatory voltage between said anode and cathode; said means comprising a source of fluctuating current of low frequency having one terminal connected to the cathode, reactive elements determining the frequency of said oscillatory voltage, said reactive elements consisting of an inductance connected between the anode and the second terminal of said current source and a second inductance connected between the grid and cathode, the magnetic coupling between said inductances being substantially zero, and a ground connection to the junction of said first inductance and the current source.

KURD RAU.